E. MANGISCH & A. REY.
COFFEE PERCOLATOR.
APPLICATION FILED SEPT. 3, 1915.
1,226,552.
Patented May 15, 1917.
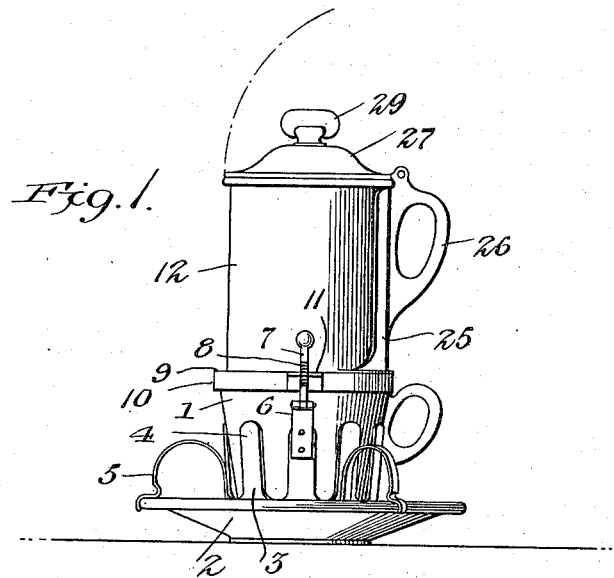
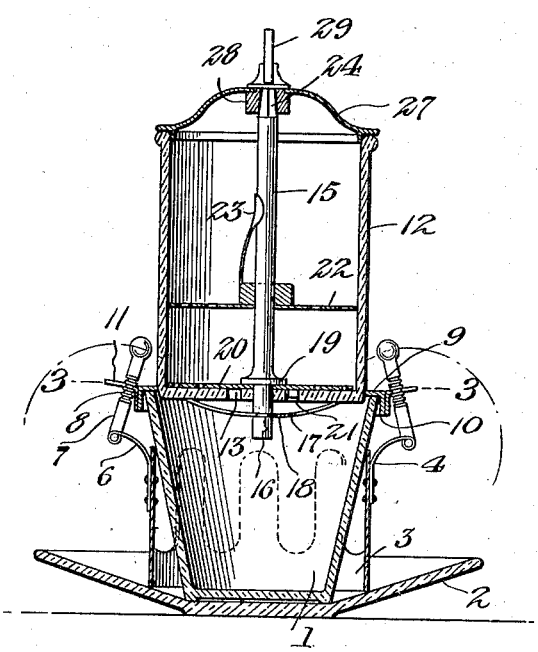
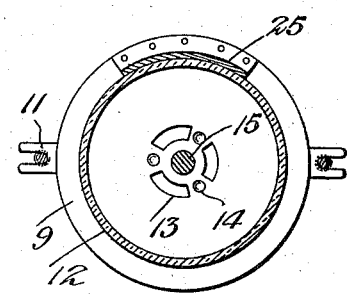
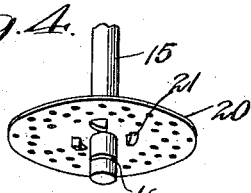
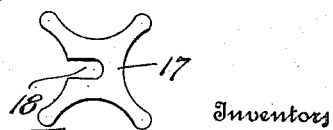
Witness.
H. E. Laughlin
Inventors
E. Mangisch,
Anthony Rey
By Victor J. Evans
Attorney

UNITED STATES PATENT OFFICE.

EDWARD MANGISCH AND ANTHONY REY, OF NEW YORK, N. Y.

COFFEE-PERCOLATOR.

1,226,552.      Specification of Letters Patent.      Patented May 15, 1917.

Application filed September 3, 1915. Serial No. 48,823.

*To all whom it may concern:*

Be it known that we, EDWARD MANGISCH and ANTHONY REY, citizens of the United States and Switzerland, respectively, residing at New York, in the county of New York and State of New York, have invented new and useful Improvements in Coffee-Percolators, of which the following is a specification.

This invention relates to coffee percolators and it consists in the novel features hereinafter described and claimed.

An object of the invention is to provide a coffee percolator of the character indicated which may be easily and quickly applied to a cup and saucer and which will hold the ground coffee at an elevated position with relation to the cup whereby the water may percolate or seep through the same and drip into the cup.

In the accompanying drawing:—

Figure 1 is a side elevation of the percolator.

Fig. 2 is a vertical sectional view of the same.

Fig. 3 is a horizontal sectional view of the same cut on the line 3—3 of Fig. 2.

Fig. 4 is a perspective view of the lower portion of the shaft and the lowermost plate carried thereby.

Fig. 5 is a plan view of the spring for holding the shaft with relation to the receptacle.

As hereinbefore stated the percolator is adapted to be used in conjunction with a cup and saucer and in the drawing the cup is indicated at 1, and the saucer at 2. An annular holder 3 is positioned upon the upper side of the bottom of the saucer 2 and the said holder is provided at its upper edge with tongues 4 adapted to engage against the sides of the cup 1 whereby the said cup is held at a central position with relation to the saucer. Spring clips 5 are attached to the sides of the holder 3 and their free ends are adapted to engage over the edge of the saucer 2 as shown in Fig. 1 of the drawing whereby the holder is held in position with relation to the saucer. Resilient arms 6 are mounted at the upper portions of two or more of the tongues 4 and bars 7 are pivotally connected with the outer ends of the said arms. Each bar 7 is provided with a set of annular grooves 8, the said grooves being located at points between the ends of the said bars.

A ring 9 is adapted to rest upon the upper edge of the cup 1 and the said ring is provided at its outer edge with an annular flange 10 which extends along the outer surface of the upper portion of the cup 1 in a manner as best shown in Fig. 2 of the drawing.

The ring 9 is provided at opposite sides with outwardly disposed slotted lugs 11 and the bars 7 are adapted to engage in the slots of the lugs, the grooves 8 of the said bars receiving the material of the lugs at the opposite sides of the slot whereby the ring 9 is securely held in position at the upper edge of the cup 1. A receptacle 12, preferably of glass, is slightly tapered at its lower end and the lowered tapered portion of the receptacle is adapted to fit snugly in the opening of the ring 9. The receptacle 12 is provided in its bottom with a series of arcuate openings 13 and depressions 14 located between the adjacent ends of the said openings. The arrangement of the openings 13 and depressions 14 is best illustrated in Fig. 3. A shaft 15 is journaled in the bottom of the receptacle 12 and the said shaft traverses the length of the said receptacle. The shaft 15 is provided below the bottom of the receptacle 12 with an annular groove 16. A spider shaped spring member 17 is provided with a slot 18 (see Fig. 5) and the said slot 18 is adapted to engage in the groove 16 of the shaft 15 whereby the end portions of the spider member 17 resiliently bear against the lower surface of the bottom of the receptacle 12 as shown in Fig. 2 of the drawing. The spider member 17 is concaved hence its intermediate portion is normally spaced below the lowest surface of the bottom of the receptacle 12. The shaft 15 is provided at a point above the bottom of the receptacle 12 with an annular shoulder 19 and a perforated plate 20 is mounted upon the shaft 15 below the shoulder 19. The plate 20 is provided at its under side with lugs 21, each said lug having a side disposed at a right angle to the plane of the plate 20 and another side disposed at an acute angle with relation to the plane of the said plate. The lugs 21 are normally received in the openings 13 in the bottom of the receptacle 12. The perforated diaphragm plate 22 is slidably mounted upon the intermediate portion of the shaft 15 and the plate 22 and fits snugly within the receptacle 12 as best shown in Fig. 2 of the drawing. The plate 22 carries at its upper side a spring member 23 which bears frictionally against the side of the shaft 15 and holds the plate 22 at an adjusted position with relation to the said shaft. The shaft 15 is provided at its upper end with a square or non-circular extremity 24.

A standard 25 is mounted on the ring 9 and extends up along the side of the receptacle 12 when the said receptacle is in position in the ring. The standard 25 is provided at its outer side with a handle 26 of any suitable design or pattern. A cover 27 is hingedly mounted at the upper end of the standard 25 and at times is adapted to fit snugly over the upper edge of the receptacle 2 as is best shown in Fig. 2 of the drawing. The cover or cap 27 is provided at its underside and at its center with a socket member 28, the socket of which is adapted to snugly receive the non-circular or squared extremity 24 of the shaft 15. The cap or cover 27 is further provided at its center and beyond its upper side with a handle or knob 29. The socket member 28 is turnably mounted in the cap or cover 27 and the handle or knob is fixed with relation to the said socket member.

In operation the percolator is used as follows:

The receptacle 12 is positioned in the ring 9 and the diaphragm plate 22 is removed from the shaft 15. The ground coffee is then poured into the receptacle 12 and rests upon the upper surface of the plate 20. The diaphragm plate 22 is then inserted in the receptacle and is moved down along the shaft 15 until the lower surface of the plate 22 encounters the ground coffee. By reason of the fact that the diaphragm plate 22 is provided with the spring 23 which engages the side of the shaft 15, the said plate 22 is held down in close contact with the coffee. Hot water is then poured into the receptacle 12 above the plate 22 and the said water passes through the openings in the plate 22 and percolates or seeps through the coffee. At any desired time an operator may grasp the handle 29 and turn the socket member 28 whereby the shaft 15 is partially rotated and the inclined sides of the lugs 21 are moved along and up along over the edges of the openings 13 in the bottom of the receptacle 12 whereby the lower ends of the lugs 21 engage in the depressions 14 at the bottom of the said receptacle. This elevates the plate 20 with relation to the bottom of the receptacle 12 and the water which at this time is saturated with the coffee passes through the openings of the plate 21 and through the opening 13 in the bottom of the receptacle into the cup 1. When a suitable quantity of the coffee is permitted to flow into the cup 1, the shaft 15 is turned by using the handle 29, whereby the lugs 21 are brought over the openings 13 and the action of the spring spider 17 will move the shaft 15 in a downward direction whereby the lower side of the plate 20 is brought in contact with the bottom of the receptacle 2 and the openings in the plate 20 are closed and the openings 13 in the bottom of the receptacle are closed by the said plate. The bars 7 are then swung back from engagement with the lugs 11 and the ring 9 and the parts mounted thereon may be removed from the upper edge of the cup 1. At this time the cup 1 may be readily removed from between the tongues 4 of the holder 3 and the contents of the cup may be consumed.

From the above description taken in conjunction with the accompanying drawing it will be seen that a coffee percolator of simple and durable structure is provided and that the same may be used to advantage for applying the device to a cup and saucer for making coffee at or about the time it is to be used or consumed.

Having described the invention what is claimed is:—

1. A coffee percolator adapted to be used in conjunction with a cup and saucer comprising a holder adapted to be positioned upon the saucer, clips carried by the holder for engaging the edge portion of the saucer, tongues provided upon the holder, said tongues adapted to snugly receive the cup and bear against the sides of the same, a ring adapted to fit over the cup, means carried by the holder for engaging the ring and a perforated receptacle detachably mounted upon the ring.

2. A percolator adapted to be used in conjunction with a cup and saucer comprising a holder adapted to be positioned upon the saucer, clips carried by the holder and engageable with the edge of the saucer, said holder having tongues adapted to snugly receive the cup, a ring adapted to rest upon the edges of the cup, spring arms carried by the holder, bars pivoted to the arms and provided with grooves engageable with the ring and a perforated receptacle detachably mounted on the ring.

3. A percolator comprising a ring, a receptacle detachably fitting in the ring, said receptacle being provided with openings located at its bottom, a shaft turnably mounted in the receptacle, a spring engaging the shaft and the receptacle for restraining the shaft against longitudinal movement with relation to the receptacle, a perforated plate carried by the shaft and provided at its underside with lugs, said lugs having one side disposed approximately at a right angle to the plane of the plate and their other sides disposed at acute angles with the plane of the said plate, said lugs adapted to enter the openings in the bottom of the receptacle.

4. A percolator comprising a ring, a receptacle detachably fitting in the ring and provided with openings located at the bottom thereof, a shaft turnably mounted in the receptacle, a spring member engaging the shaft and the receptacle, a perforated plate carried by the shaft and provided with lugs at its lower side adapted to enter the openings in the bottom of the receptacle, said receptacle having at its bottom, depressions adapted at times to receive the lower ends of the said lugs, a diaphragm plate movably mounted upon the shaft, a cover for the receptacle and means turnably mounted on the cover for turning the shaft.

5. A percolator comprising a ring, a receptacle detachably fitting therein and provided with openings located at the bottom thereof, a shaft turnably mounted in the receptacle, a spring member engaging the shaft and the receptacle, and a perforated plate carried by the shaft and provided at its lower side with lugs adapted to enter the openings at the bottom of the receptacle, a perforated diaphragm plate slidably mounted upon the shaft, a cover for the receptacle, a socket member turnably mounted in the cover, said socket member adapted to receive the upper end of the shaft whereby the said shaft may be turned by turning the socket member.

In testimony whereof we affix our signatures in presence of two witnesses.

EDWARD MANGISCH.
ANTHONY REY.

Witnesses:
ANNA V. DOYLE,
GEO. A. BYRNE.

Copies of this patent may be obtained for five cents each, by addressing the "Commissioner of Patents, Washington, D. C."